United States Patent
Baracca et al.

(10) Patent No.: US 11,240,765 B2
(45) Date of Patent: Feb. 1, 2022

(54) REGULATING TRANSMISSION POWERS FROM NODES

(71) Applicant: Nokia Solutions and Networks Oy, Espoo (FI)

(72) Inventors: Paolo Baracca, Stuttgart (DE); Adrian Garcia Rodriguez, Blanchardstown (IE); Lorenzo Galati Giordano, Blanchardstown (IE); Giovanni Geraci, Dublin (IE); David Lopez-Perez, Blanchardstown (IE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/964,055

(22) PCT Filed: Jan. 15, 2019

(86) PCT No.: PCT/EP2019/050850
§ 371 (c)(1),
(2) Date: Jul. 22, 2020

(87) PCT Pub. No.: WO2019/145185
PCT Pub. Date: Aug. 1, 2019

(65) Prior Publication Data
US 2021/0051604 A1 Feb. 18, 2021

(30) Foreign Application Priority Data

Jan. 26, 2018 (EP) ..................................... 18153744

(51) Int. Cl.
*H04W 52/28* (2009.01)
*H04B 17/318* (2015.01)
*H04W 52/36* (2009.01)

(52) U.S. Cl.
CPC ........ *H04W 52/283* (2013.01); *H04B 17/318* (2015.01); *H04W 52/367* (2013.01)

(58) Field of Classification Search
CPC .. H04W 52/28; H04W 52/283; H04B 7/0617; H04B 17/318
(Continued)

(56) References Cited

U.S. PATENT DOCUMENTS

| 6,456,856 B1* | 9/2002 | Werling | H01Q 1/243 455/129 |
| 2003/0171131 A1* | 9/2003 | Kettering | H01Q 1/246 455/522 |
| 2017/0077765 A1* | 3/2017 | Bell | G01S 15/88 |

OTHER PUBLICATIONS

Fryderyk Lewicki, "K.Supp-5G_EMF_Impact: 5G technology and human exposure to RF EMF," International Telecommunication Union, Telecommunication Standardization Sector, SG5-TD362, pp. 1-11, Sophia Antipolis, Nov. 13-22, 2017.

(Continued)

*Primary Examiner* — John J Lee
(74) *Attorney, Agent, or Firm* — Fay Sharpe LLP

(57) ABSTRACT

A method for modifying an electromagnetic field distribution of a node in a telecommunication network, comprising determining the presence of an entity within a region of interest, and regulating transmission power to the region of interest from the node by varying a spatio-temporal transmission profile of the node in response to determining the presence of the entity in the region for a period of time longer than a predetermined threshold value, wherein modifying the electromagnetic field distribution of the node comprises modifying an average electromagnetic field distribution of said node.

15 Claims, 5 Drawing Sheets

(58) Field of Classification Search
USPC .................. 455/522, 69, 501, 63.1, 67.11
See application file for complete search history.

(56) References Cited

OTHER PUBLICATIONS

International Search Report for PCT/EP2019/050850 dated Apr. 4, 2019.

* cited by examiner

REGULATING TRANSMISSION POWERS FROM NODES

TECHNICAL FIELD

Aspects relate, in general to a method for regulating transmission powers from nodes, to a node and to a non-transitory machine-readable storage medium.

BACKGROUND

A node, e.g. base station (BS), in a wireless telecommunications system can be surrounded by an exclusion zone in order to limit absorption of the electromagnetic field (EMF) generated by a wireless transmitter of the node. The exclusion zone is intended to safeguard human health.

In recent years, many standards for wireless communications in licensed bands like UMTS, LTE, and LTE-Advanced use multi-antenna techniques, also known as multiple-input multiple-output (MIMO). By equipping a BS with multiple antennas and using MIMO, improvements are possible. For example, multiple antennas can be used to serve multiple user equipment (UEs) on the same band and at the same time, with the UEs spatially separated by means of different beamformers, thereby increasing cell throughput. Furthermore, multiple antennas can focus power/energy in a specific spatial direction, thus allowing a served UE to observe an increased signal to interference plus noise power ratio (SINR). Accordingly, for the same transmit power, beamforming gains entail an increase in the receive power and, consequently, also increase the size of an exclusion zone around such BSs.

SUMMARY

According to an example, there is provided a method for modifying an electromagnetic field distribution of a node in a telecommunication network comprising determining the presence of an entity within a region of interest, and regulating transmission power to the region of interest from the node by varying a spatio-temporal transmission profile of the node in response to determining the presence of the entity in the region for a period of time longer than a predetermined threshold value, wherein modifying the electromagnetic field distribution of the node comprises modifying an average electromagnetic field distribution of said node. Varying the spatio-temporal transmission profile of the node can further comprise reducing transmission power of the node. Varying the spatio-temporal transmission profile of the node can further comprise reducing a scheduling frequency used by the node. Varying the spatio-temporal transmission profile of the node can further comprise at least one of modifying a gain, and transmission power for the region, and generating a transmission null at the region. A measure of actual or potential power received from the node within the region of interest can be determined. The spatio-temporal transmission profile of the node can be varied until the entity leaves the region. The predetermined threshold value can a value in a range from 10 ms to less than 6 minutes. The predetermined threshold value can a value in a range from 1s to 1-3 minutes. The method can further comprise calculating a measure of power received within the region of interest, and determining whether the measure of received power is above a predetermined maximum threshold power value. The measure of power received can be an average level of received power over a predetermined time interval. Determining the presence of an entity can further comprise using a proximity sensor for detecting the presence of the entity within the region of interest.

According to an example, there is provided a node for a telecommunication network comprising at least one processor, and at least one memory including computer program code, the at least one memory and the computer program code configured to, with the at least one processor, cause the node to modify a spatio-temporal transmission profile of the node in response to detection of an entity within a dynamic region of interest surrounding the node for a period of time longer than a predetermined threshold value, wherein modifying the spatio-temporal transmission profile of the node comprises modifying an average electromagnetic field distribution of said node. The node can further comprise a proximity sensor to detect the presence of an entity with the region of interest. The node can further comprise an array of antenna elements to generate a directionally selective beam profile for the node, and the processor can further generate one or more commands to cause the node to produce a null point in the beam profile for the node.

According to an example, there is provided a non-transitory machine-readable storage medium encoded with instructions executable by a processor of a node to cause the node to modify an electromagnetic field distribution of the node, the machine-readable storage medium comprising instructions to determine the presence of an entity within a region of interest, and regulate transmission power to the region of interest from the node by varying a spatio-temporal transmission profile of the node in response to determining the presence of the entity in the region for a period of time longer than a predetermined threshold value, wherein modifying the electromagnetic field distribution of the node comprises modifying an average electromagnetic field distribution of said node. The non-transitory machine-readable storage medium can be further encoded with instructions to cause the node to generate a directionally selective beam profile for the node, and cause the node to produce a null point in the beam profile for the node.

BRIEF DESCRIPTION OF THE DRAWINGS

Embodiments will now be described, by way of example only, with reference to the accompanying drawings, in which.

DESCRIPTION

Figure 1:
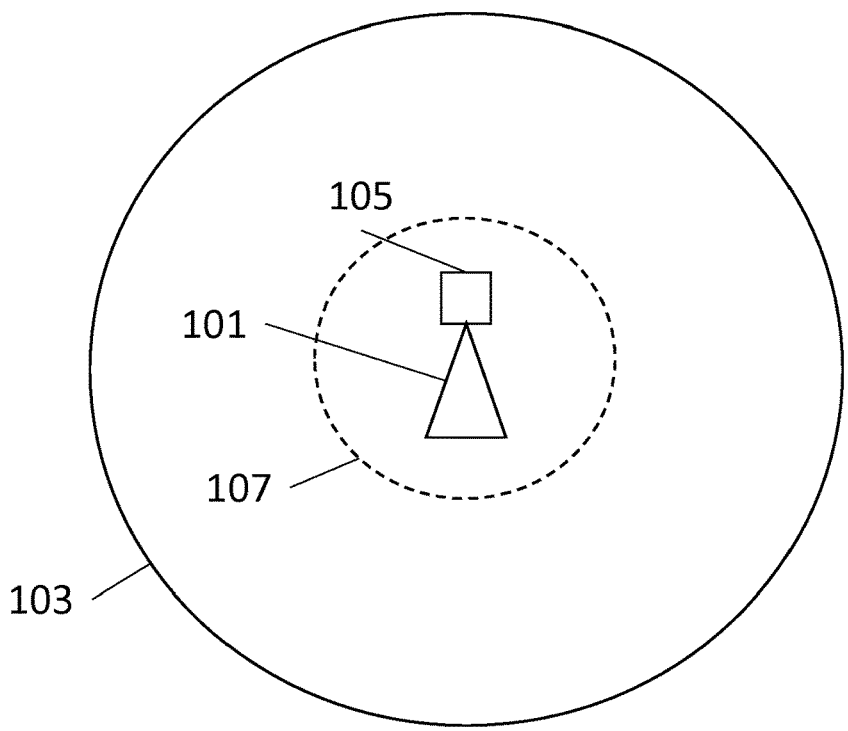
FIG. 1 is a schematic representation of part of a telecommunication network according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

The number of controllable antenna ports at a BS in LTE advanced for example numbers eight. As such, an increase in an exclusion zone dimension around such a BS as a result of the use of MIMO can be acceptable and not too problematic for the operators as the limits imposed by regulators representing maximum EMF absorption by humans can still be met with a modest increase in the area around the BS.

However, in contrast, in recent years, a new technique known as Massive MIMO (M-MIMO) has encountered momentum in both the academia and the standardization community. M-MIMO relates to equipping a BS with an increased number of antennas. For example, in some of the latest LTE releases and in 5G systems, BSs with 64 antennas are considered, and in the next few years operators will likely deploy BSs with hundreds of antennas capable of providing very large beamforming gains. In such systems, meeting the EMF requirements will become challenging, although essential for safeguarding human health.

The standard method to meet EMF constraints imposed by a regulator at a BS is to design an exclusion zone around the BS and ensure no access to this region to the public. For example, if the BS is equipped with one isotropic antenna, the exclusion zone is a sphere around this antenna, whose radius depends on the maximum transmit power. When the BS is equipped with multiple antenna elements, beamforming can be used, and therefore, the exclusion zone is designed by also considering the beamforming gain.

The radius, r, of an exclusion zone around a BS can be computed as:

$$r = \frac{1}{E_{MAX}} \sqrt{\frac{ZPG}{4\pi}} \quad (I)$$

where P is the BS transmit power, G the beamforming gain, $E_{MAX}$ is the maximum electric field allowed at a given carrier frequency and Z is the free space impedance.

Assuming Z=120 Ohm, P=40 W and $E_{MAX}$=61 V/m (EMF constraint at 2 GHz carrier frequency), and approximating G by the number M of antenna elements, the radii of the exclusion zones for a BS either with 1 antenna or with 64 antenna elements are as follows:

$r_{M=1,iso} \approx 0.6$ m $r_{M=64,iso} \approx 4.5$ m respectively.

In reality, BSs do not use isotropic antennas, but typically there are three BSs in each site, each BS equipped with an array of antennas covering a sector. As a result, the exclusion zone around each BS has an irregular shape that depends on the design of the specific antenna element and on the array structure. Some usual parameters for each antenna element of the array are a gain of 8 dBi, a half-power beamwidth of 65° and a front-to-back ratio of 30 dB. By considering this more practical case, the largest dimension of the exclusion zone for a BS either with 1 antenna or with 64 antenna elements can be approximated using (I) as:

$r_{M=1,8dBi} \approx 1.4$ m $r_{M=64,8dBi} \approx 11.3$ m respectively.

Note that an exclusion zone designed using a standard method as noted above guarantees 100% safety in the sense that any kind of EMF absorption outside of the exclusion zone will meet the constraints imposed by the regulator. However, on the other hand, in these numerical examples, meeting these EMF constraints while deploying M-MIMO BSs is physically challenging as the required exclusion zone tends to be very large. Since real estate is at a premium, especially in the regions where BSs are deployed, extending an exclusion zone is not practicable.

Because of this issue, statistical models for designing the exclusion zone can be used. The principle behind such statistical models is that an exclusion zone can be designed by leveraging information representing traffic and user distribution around a BS. By exploiting this information (and therefore not only by using geometrical considerations), a percentage threshold (for instance 99%) can be defined such that:

an exclusion zone is designed to ensure that the EMF constraints are met within this threshold percentage of cases; and additional mechanisms can be implemented to handle the remaining (for instance 1%) of the cases.

This enables a reduction in the dimensions of an exclusion zone enabling lawful deployment of M-MIMO BSs by operators, since otherwise they would not manage to re-use the same sites that LTE and LTE-Advanced BSs are using nowadays for example. Accordingly, in order for these models to be accepted, BSs should have mechanisms to mitigate the generated EMF in the remaining small number (I % for example) of cases.

According to an example, there is provided a method for modifying an average electromagnetic field distribution of a node in a telecommunication network, comprising determining the presence of an entity within a region of interest, and regulating transmission power to the region of interest from the node by varying a spatio-temporal transmission profile of the node. In an example, a spatio-temporal transmission profile is a transmission profile that can be defined in terms of spatial and/or temporal characteristics or parameters. Accordingly, varying such a spatio-temporal transmission profile involves varying one or both of a spatial or temporal parameter of the transmission profile. For example, a spatial parameter can be the shape of the profile, such as the shape of a beamformed transmission profile. A temporal parameter can be a scheduling frequency for example.

That is, considering, for example, a massive MIMO BS with an exclusion zone designed using the statistical models as described above, a process is provided that enables a BS to reduce generated EMF levels to acceptable values, also in the cases/scenarios where the exclusion zone alone does not guarantee that the EMF constraints will be met.

Typically, the maximum electric and magnetic fields for a region around a BS as imposed by regulators are obtained by averaging over a time window. For example, the maximum values can be obtained by averaging over a period of time which is of the order of minutes (e.g. 6 minutes). This time window is generally much longer than the time scale at which some physical layer procedures are performed at the BS (for instance, a beamformer can be updated every few milliseconds).

According to an example, a BS can determine whether there is an entity, such as a person for example, in close proximity that might be absorbing an excessive level of EMF. In an example, an entity can include a human with or without a UE on their person. The presence (or not) of a UE can dictate the mechanism used to detect a human.

Detecting this can be accomplished by either using RF measurements or by equipping the BS with sensors assigned to this task. For example, a BS can be provided with logic to enable such an inference and a hardware/sensor to detect the presence of an entity within a region that may be dangerous.

According to an example, by leveraging the fact that the EMF constraint is statistical, a BS can execute one of the following actions when an entity is detected in close proximity to the BS:

a) Reduce the BS transmit power;
b) Reduce the user scheduling frequency;
c) Adapt the beamformer by either i) reducing the beamforming gain or the transmit power toward specific spatial directions, or ii) creating radiation nulls toward those;
d) Any combination of a), b), and c).

That is, upon determining the presence of an entity within a region of interest, transmission power to the region of interest from the node can be regulated by varying a spatio-temporal transmission profile of the node using one or more of the techniques noted above, which are explained in more detail below.

In an example, the region of interest can be characterised as a region within which a received power from the node will exceed a safe limit over a predetermined period of time. For example, as noted above, regulations are in place that limit the exposure of a person to an EM field over a period of time such that the average level received by the person over the course of that period is less than a predetermined maximum value deemed to be safe. As such, a region of interest can be a region around a node in which an entity, such as a human, will be exposed to an EMF that would exceed a recommended amount over a predetermined period of time. In a M-MIMO system, the region of interest can be dynamic, since the focus of a beam or beams from the node can vary over time. Thus, an average electromagnetic field distribution of a node in a particular region around the node over a given period of time can vary.

In an example, the detection/action methods outlined above can be refined by exploiting knowledge of historical detections and action activities, e.g., time of the day and spatial directions at which one of the actions is required for example. Furthermore, a line of sight condition for a wireless propagation link between a node and a UE can be assumed at the point that EMF mitigation tools are to be used (with statistical models) since it is at this point that the UE is likely to be in close proximity to the node, e.g., tens of meters.

According to an example, such UEs can be detected using RF measurements. For instance, each UE performs measurements on the useful signal power, $P_R$, like the reference signal received power (RSRP) in LTE, that are reported to the BS using measurement reports at a frequency that is typically between 40 ms and 480 ms. Although regulations specify maximum electric and magnetic fields, these can be mapped in a straightforward way to a maximum measured power, $P_{R,MAX}$. An entity (by virtue of a UE) can then be detected by a BS as in too close a proximity when the reported received power, $P_R$, is above a predetermined threshold, $P_{R,MAX}$. In an example, the employment of alternative UE localization methods such as those based on LTE location services or global positioning system (GPS) may also be used.

This method can detect mobile UEs, i.e., people carrying smartphones, tablets or other devices connected to the BS or the network. However, the EMF limits are to be satisfied also when an entity such as a person without any device connected to the BS gets too close to it. According to an example, in order to enable detection of such situations, a BS can be equipped with an infrared (IR) sensor for human detection. These sensors enable a BS to detect the presence of human beings even if they are not carrying a UE, such as a smartphone or tablet. The average time-window related to the EMF constraints, as noted above, is at least an order of magnitude larger than the inherent delay introduced by the sensor detection and by the sensor-BS communication. Accordingly, using such a sensor to detect the presence of an entity within a region of interest does not introduce a delay that would be considered dangerous.

According to an example, once an entity, such as a person (with or without a UE) is identified as being in close proximity to a BS, mechanisms to reduce the power sent towards that person/UE can be implemented.

In an example, the transmit power of the BS can be reduced. For example, an estimate of the received power, $P_R$, at the entity (person+UE) can be produced using the UE measurement report. The BS can then exploit the line of sight condition described above to estimate the distance, d, between the BS and the person. In the case of an entity without a UE (e.g. just a person), this distance estimation can also be computed by the IR sensor or alternative localization procedures. Then, by exploiting the free space characteristics, the BS can reduce its total transmit power, $P_T$, in order to meet an electromagnetic field (EMF) constraint.

In an example, the BS can reduce the scheduling frequency to a UE. That is, by leveraging the fact that the EMF constraint is statistical (e.g., power measured over a window of several minutes), the BS can also decide to schedule a UE less frequently, i.e., in a reduced number of time-frequency resources. The BS, having knowledge of its transmit power $P_T$ and a measure of the distance between the BS and the UE, d, can thus generate an estimate of the received power, $P_R$.

With this information, the BS can decide to still use full power but transmit in a reduced number of time-frequency resources. For instance, the BS could compute the number of time-frequency resources that the UE should be scheduled at a given transmit power to meet an EMF constraint. As such an entity will experience a reduced average received power.

In an example, a BS beamformer can be used in order to either reduce the beamforming gain or to transmit power toward specific directions or by creating radiation nulls toward those directions. For example, if the BS has knowledge of the channel connecting the BS to an affected UE, for instance regarding the LOS angle α, it can exploit this information in the beamforming design. For instance, when serving that UE in close proximity, it can reduce the beamforming gain by making the beam wider. In this way, the power received at the UE decreases, and at the same time, the broader beam makes the communication more robust to channel imperfections and mobility. Alternatively, the BS can also modify the precoder to allocate less power in the direction of that UE, or it can create a radiation null toward the angle α when serving the other active UEs in the cell.

According to an example, any combination of the above-described power regulation methods can be used.

The detection/action procedure described above can be implemented in a standalone manner. Alternatively, in an example, a BS can collect statistics on the human beings that are located nearby. For example, if the BS is mounted on the top of buildings, nearby UEs are more likely to appear from certain angular directions. The BS, after estimating these specific limited directions, can take some pro-active actions to reduce the probability of a human being absorbing an excessive level of EMF. For instance, the BS can use beamformers directed toward active UEs in the cell by creating radiation nulls (or at least reducing the power) toward these specific limited directions, although no human being has been detected there at that time instant.

Moreover, the BS can collect statistics also from other sources. For instance, the BS can be connected to a data analytics engine in the cloud to adapt beams and power according to seasons, daily habits or weather conditions for example. Furthermore, the operator running the BS can ask/obtain data from third parties that have real-time information regarding the position of their customers.

This can be formulated as a reinforcement and learning problem, where there is a number of states (e.g., power and null configurations) and actions (move from a given state to another), and the target is to learn the optimal set of actions that minimize a cost function (number of EMF violations).

FIG. 1 is a schematic representation of part of a telecommunication network according to an example. A node 101, such as a base station, serves a cell 103 within which multiple UEs may be present at any one time. Node 101 includes an antenna array 105 capable of forming a spatially selective beam for transmission of (and reception of) signals to (from) UEs. An exclusion zone 107 is depicted. As noted above, exclusion zone 107 will prevent a high percentage of cases of over-exposure of generated EMF from node 101.

Figure 2:
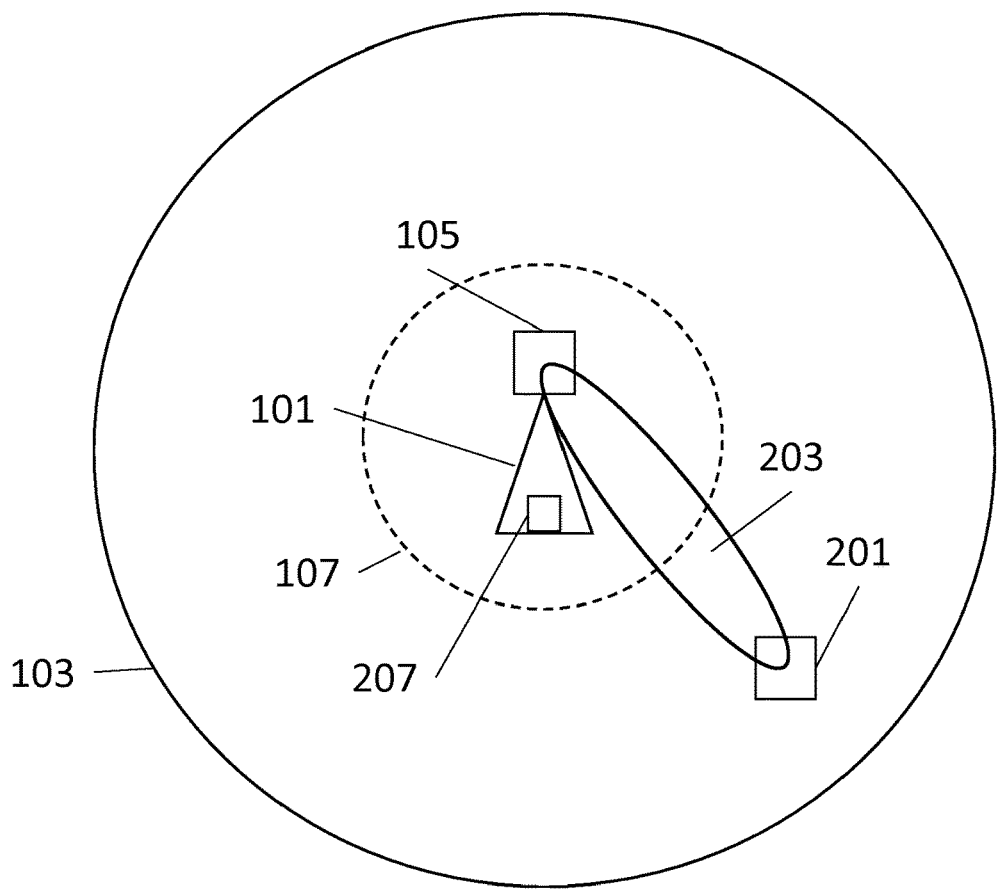
FIG. 2 is a schematic representation of part of a telecommunication network according to an example.

FIG. 2 is a schematic representation of part of a telecommunication network according to an example. In the example of FIG. 2, a UE 201 is being served using a beam focused from node 101. The area 203 shown in FIG. 2 represents the region in which a high level of power would be received by an entity straying into that region. As such, area 203 represents a region of interest since we are concerned with regulating power received by an entity in this region. In the example of FIG. 2, node 101 comprises a sensor 207, such as an IR sensor that is configured to sense the presence of an entity within the region of interest 203. As noted above, since the position of the region of interest 203 can vary in a system in which a beam is formed in various directions, multiple such sensors can be provided for node 201 in order to provide sensor coverage around the node 101, or coverage for a specific area of interest.

In an example, beamforming can modify an exclusion zone around a node such that area 203 becomes the region that we are interested in attending to for anything that is within it. In an example, the region of interest can be characterised as the area defined by the relative complement of areas 107 and 203 since the area defined by 107 is physically out of bounds anyway.

Figure 3:
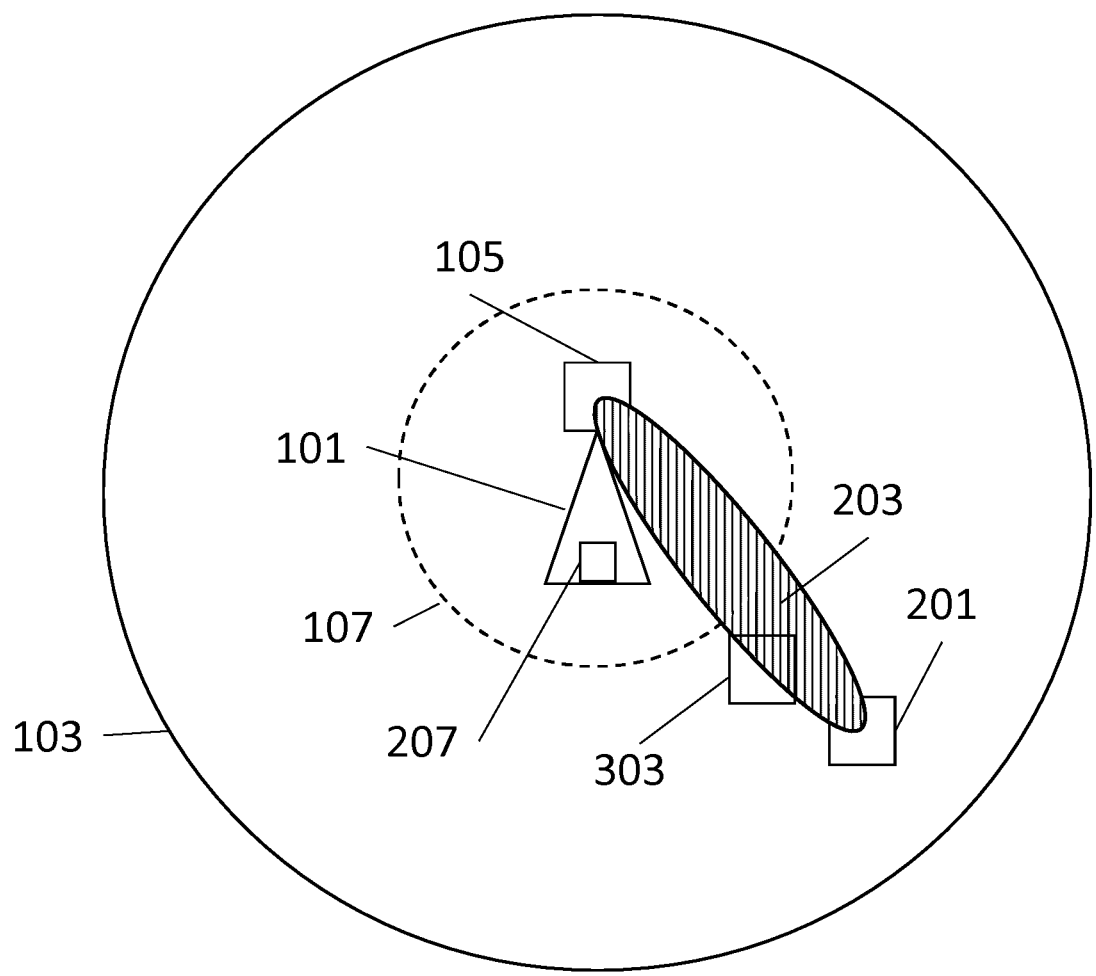
FIG. 3 is a schematic representation of a regulated transmission power profile of a node according to an example.

FIG. 3 is a schematic representation of a regulated transmission power profile of a node according to an example. In the example of FIG. 3 a UE 201 is served by node 101. An entity 303 is detected in the region of interest 203 defined by the beam that is used to serve UE 201. More particularly, entity 303 is detected in the region 203 in which it is likely to experience a high EMF from the node 101 which would cause the entity 303 to exceed a threshold level over a predetermined period of time (as dictated by the regulator). As noted above, the detection of the entity 303 can be either using RF measurements from an associated UE or using a sensor or sensors 207.

According to an example, a predetermined period of time (time window) can vary. For example, one value that can be used to compute average EMF is 6 minutes, which is a regulatory period in use in Germany for example. In an example, with the use of mechanisms such as beamforming and user scheduling, which are performed at a BS every few milliseconds, the time-window can be of the order of tens of milliseconds. In general, a relatively longer time window provides more flexibility but can result in some delays as constraints can be violated more often. A relatively shorter time-window provides less flexibility, but implies the use of a more conservative process with fewer delays. In an example, a time window in the range from about 10 ms to 6 minutes can be used. In a further example, a time window of about 100 ms to 1 or a few seconds can be used.

In response to detection of the entity 303, the transmission profile of the node 101 can be varied in order to regulate a transmission power within the region of interest 203 from the node 101. In the example of FIG. 3, the transmission profile is varied by reducing the power from node 101, thereby reducing the level of received power in the region of interest to allowed levels such that entity 303 does not receive a level of power from the node that would exceed a regulatory maximum over a predetermined period of time. The shape of the beam remains the same, but the power thereof is reduced.

Similarly to the case described with reference to FIG. 3, the transmission profile of the node 101 can be varied in order to regulate a transmission power to the region of interest 203 from the node 101 by adapting the user scheduling frequency from node 101 to UE 201, as described above, to reduce the level of received power in the region of interest to allowed levels such that entity 303 does not receive a level of power from the node that would exceed a regulatory maximum over a predetermined period of time.

Similarly to the case described with reference to FIG. 3, the transmission profile of the node 101 can be varied in order to regulate a transmission power to the region of interest 203 from the node 101 by adapting a beamformer 401 (see FIG. 4) of the node 101 in order to reduce the beamforming gain in the direction of UE 201 to reduce the level of received power in the region of interest to allowed levels such that entity 303 does not receive a level of power from the node that would exceed a regulatory maximum over a predetermined period of time.

Figure 4:
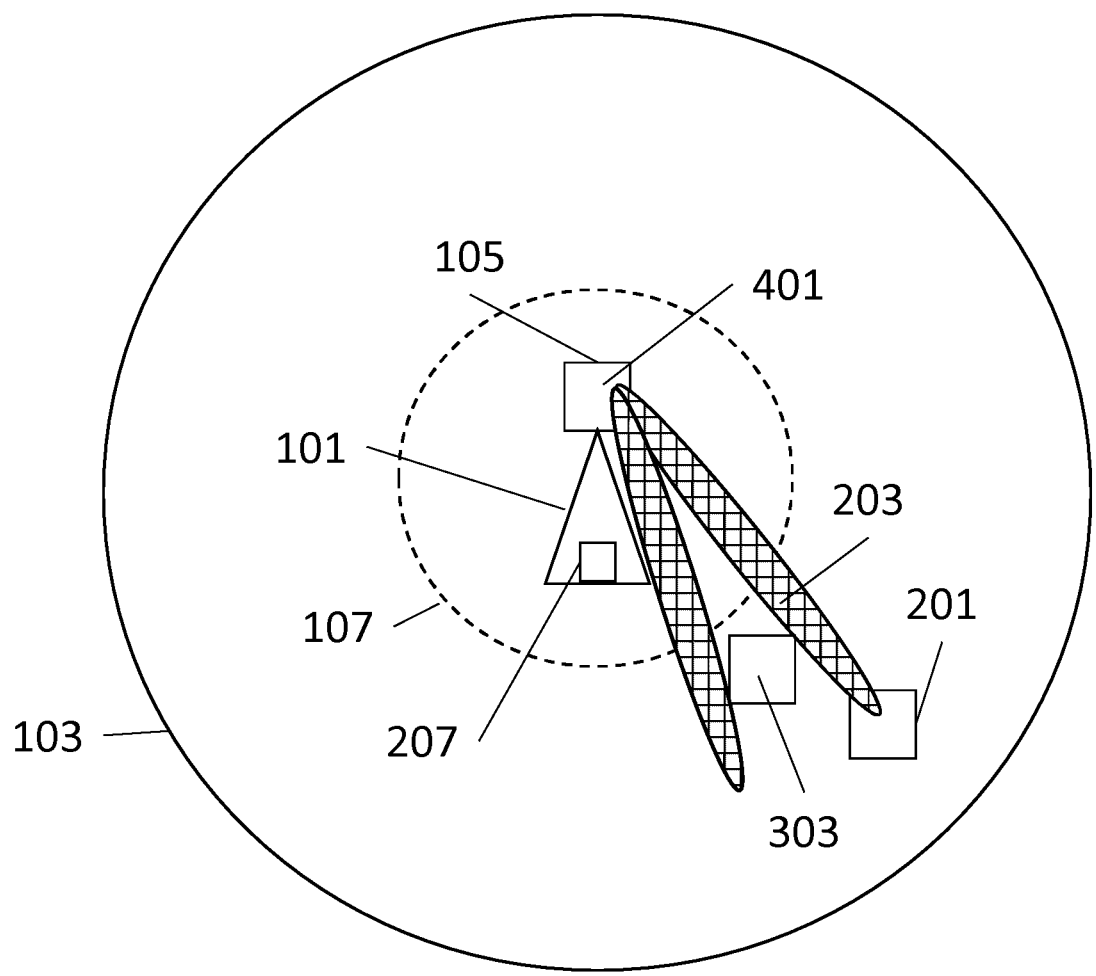
FIG. 4 is a schematic representation of a regulated transmission power profile of a node according to an example.

FIG. 4 is a schematic representation of a regulated transmission power profile of a node according to an example. Similarly to the case described with reference to FIG. 3, the transmission profile of the node 101 in the example of FIG. 3 is varied in order to regulate a transmission power to the region of interest 203 from the node 101 within which the entity 303 was detected. In this case, a beamformer 401 of the node 101 is adapted to create a radiation null in the direction of entity 303 to reduce the level of received power to allowed levels such that entity 303 does not receive a level of power from the node that would exceed a regulatory maximum over a predetermined period of time.

In an example, a transmission power profile of a node can be regulated in response to detection of an entity within a region of interest. In some cases, the region of interest can relate to an area in which a beam is planned to be formed. For example, with reference to FIG. 4, UE 201 can fall within the cell 103 so that it can be served by node 101. Before a beam is formed from node 101 to UE 201, the presence of entity 303 in the region of interest can be determined. In this case, the region of interest is characterised as the region in which a beam may be formed in order to serve a UE and which would expose the entity 303 to a high level of power from the node. As such, the transmission power from the node can be regulated as described above in order to accommodate the presence of the entity 303.

Figure 5:
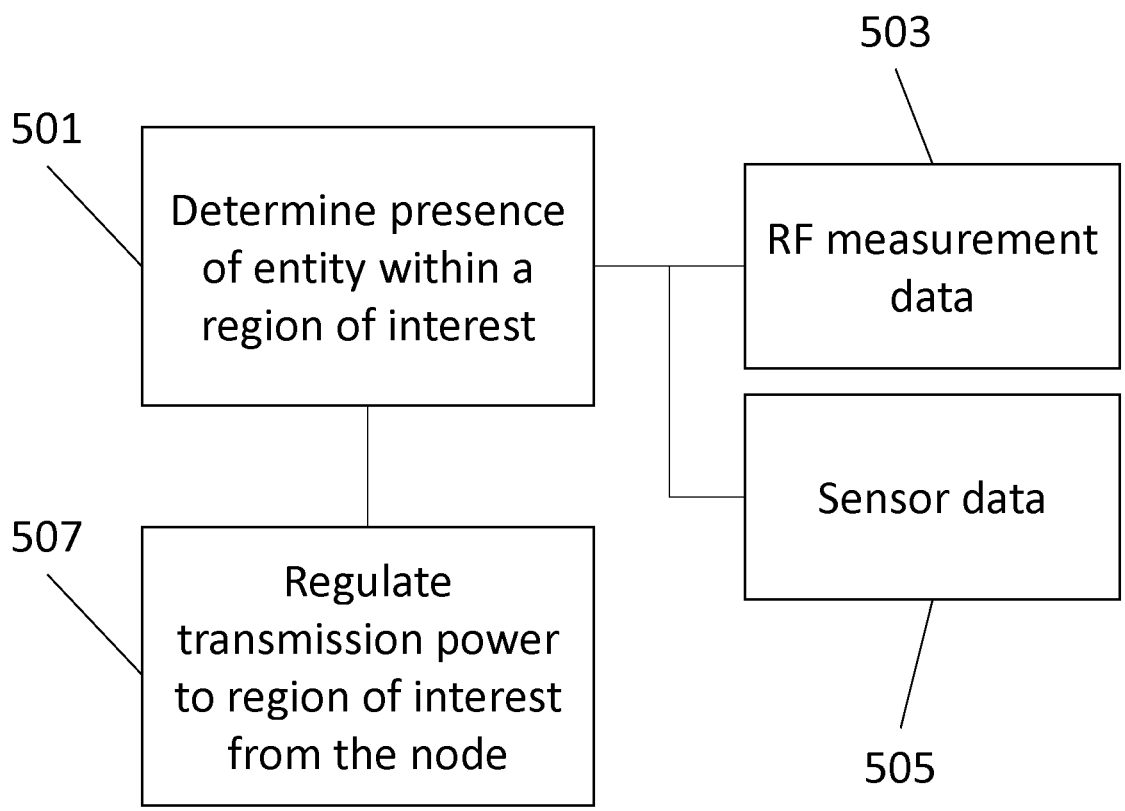
FIG. 5 is a flowchart of a method for modifying an average electromagnetic field distribution of a node in a telecommunication network according to an example.

FIG. 5 is a flowchart of a method for modifying an average electromagnetic field distribution of a node in a telecommunication network according to an example. In block 501, the presence of an entity within a region of interest is determined. As described above, the presence of the entity can be detected using RF measurement data 503 and/or sensor data 505 from one or more sensors of the node, such as IR sensors for example. In block 507 transmission power to the region of interest from the node is regulated by varying a spatio-temporal transmission profile of the node, such as by using any one or more of a), b) and c) described above for example, in response to determining the presence of the entity in the region for a period of time longer than a predetermined threshold value, wherein modifying the electromagnetic field distribution of the node comprises modifying an average electromagnetic field distribution of said node.

Figure 6:
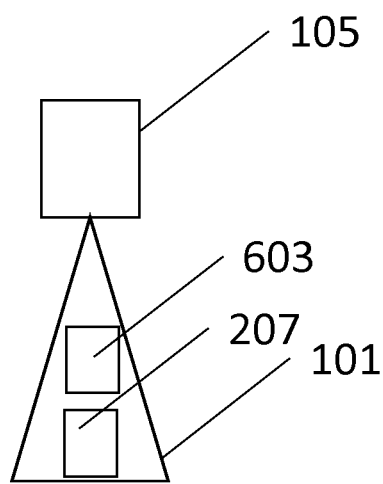
FIG. 6 is a schematic representation of a node according to an example.

FIG. 6 is a schematic representation of a node according to an example. Node 101 can be a base station in a telecommunication network. In the example of FIG. 6, the node 101 comprises a processor 603 that is configured to modify a spatio-temporal transmission profile of the node in response to detection of an entity within a dynamic region of interest surrounding the node. In an example, the processor 603 can vary the spatio-temporal transmission profile in one or more of the ways described above. In an example, node 101 comprises a proximity sensor 207 to detect the presence of an entity within the region of interest. In an example, sensor 207 is an IR sensor configured to detect the presence of an entity, such as a human, within its field of view. As described above, more than one such sensor may be provided in order to cover a wider field of view around the node and/or to increase sensitivity. Node 101 comprises an array of antenna elements 105 to generate a directionally selective beam profile for the node, the processor further to generate a null point in the beam profile for the node. With reference to FIG. 4 for example, the processor 603 can adapt the beam in the presence of an entity in order to create a region or point within the beam profile that is a null (devoid of substantially any EMF from the node) or that is a region that provides a significantly lower EMF than the rest of the profile.

Examples in the present disclosure can be provided as methods, systems or machine-readable instructions. Such machine-readable instructions may be included on a computer readable storage medium. The storage medium can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be used and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus (for example, nodes or base stations) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 7:
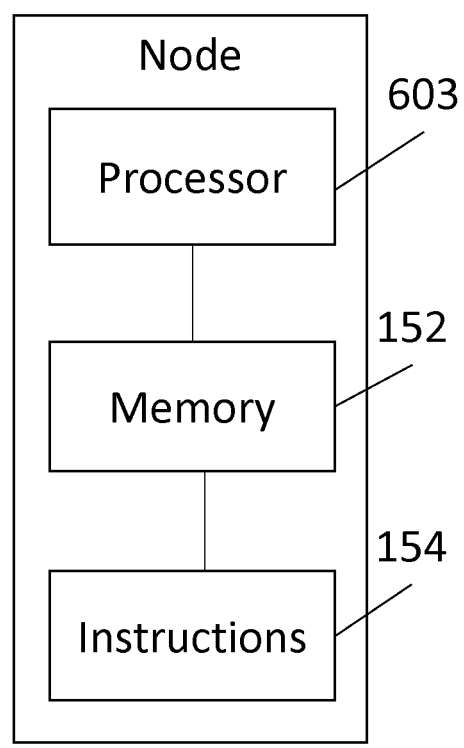
FIG. 7 is an example of a processor of a node according to an example.

FIG. 7 shows an example of a processor 603 of a node, associated with a memory 152. The memory 152 comprises computer readable instructions 154 which are executable by the processor 603. The instructions 154 comprise instructions to cause the node to, at least: determine the presence of an entity within a region of interest, and regulate transmission power to the region of interest from the node by varying a spatio-temporal transmission profile of the node. Instructions can be provided to generate a directionally selective beam profile for the node, and further cause the node to generate a null point in the beam profile for the node Such machine-readable instructions may also be loaded onto a computer or other programmable data processing devices, so that the computer or other programmable data processing devices generate commands to cause the node to perform a series of operations to produce computer-implemented processing, thus the instructions executed on the computer or other programmable devices provide commands to cause the node to perform operations for realizing functions specified by flow(s) in the flow charts and/or block(s) in the block diagrams.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality. The features of any dependent claim may be combined with the features of any of the independent claims or other dependent claims as long as such combination is compatible and/or complimentary.

The invention claimed is:

1. A method for modifying an average electromagnetic field distribution of a node in a telecommunication network, the method comprising:
    determining the presence of an entity within a region of interest; and
    regulating transmission power to the region of interest from the node by varying a spatio-temporal transmission profile of the node, wherein
    varying a spatio-temporal transmission profile of the node is conducted in response to determining the presence of the entity in the region of interest for a period of time longer than a predetermined threshold value.

2. A method as claimed in claim 1, wherein varying the spatio-temporal transmission profile of the node further comprises reducing transmission power of the node.

3. A method as claimed in claim 1, wherein varying the spatio-temporal transmission profile of the node further comprises reducing a scheduling frequency used by the node.

4. A method as claimed in claim 1, wherein varying the spatio-temporal transmission profile of the node further comprises at least one of modifying a gain, and transmission power for the region, and generating a transmission null at the region.

5. A method as claimed in claim 1, further comprising determining a measure of actual or potential power received from the node within the region of interest.

6. A method as claimed in claim 1, further comprising varying the spatio-temporal transmission profile of the node until the entity leaves the region.

7. A method as claimed in claim 1, wherein the predetermined threshold value is a value in a range from 10 ms to less than 6 minutes.

8. A method as claimed in claim 1, further comprising:
    calculating a measure of power received within the region of interest; and
    determining whether the measure of received power is above a predetermined maximum threshold power value.

9. A method as claimed in claim 8, wherein the measure of power received is an average level of received power over a predetermined time interval.

10. A method as claimed in claim 1, wherein determining the presence of an entity further comprises using a proximity sensor for detecting the presence of the entity within the region of interest.

11. A node for a telecommunication network comprising:
    at least one processor; and
    at least one memory including computer program code;
    the at least one memory and the computer program code configured to, with the at least one processor, cause the node to:
    modify a spatio-temporal transmission profile of the node, wherein modifying the spatio-temporal transmission profile of the node comprises modifying an average electromagnetic field distribution of said node, and wherein
    modifying a spatio-temporal transmission profile of the node is conducted in response to detection of an entity within a dynamic region of interest surrounding the node for a period of time longer than a predetermined threshold value.

12. A node as claimed in claim 11, further comprising a proximity sensor to detect the presence of an entity within the region of interest.

13. A node as claimed in claim 11, further comprising an array of antenna elements to generate a directionally selective beam profile for the node, and
    wherein the processor further generates one or more commands to cause the node to produce a null point in the beam profile for the node.

14. A non-transitory machine-readable storage medium encoded with instructions executable by a processor of a node to cause the node to modify an electromagnetic field distribution of the node, the machine-readable storage medium comprising instructions to:
    determine the presence of an entity within a region of interest; and
    regulate transmission power to the region of interest from the node by varying a spatio-temporal transmission profile of the node,
    wherein modifying the electromagnetic field distribution of the node comprises modifying an average electromagnetic field distribution of the node, and wherein
    varying a spatio-temporal transmission profile of the node is conducted in response to determining the presence of the entity in the region of interest for a period of time longer than a predetermined threshold value.

15. A non-transitory machine-readable storage medium as claimed in claim 14, further encoded with instructions to cause the node to:
    generate a directionally selective beam profile for the node, and
    wherein the processor further generates one or more commands to cause the node to produce a null point in the beam profile for the node.

* * * * *